Figure 1:
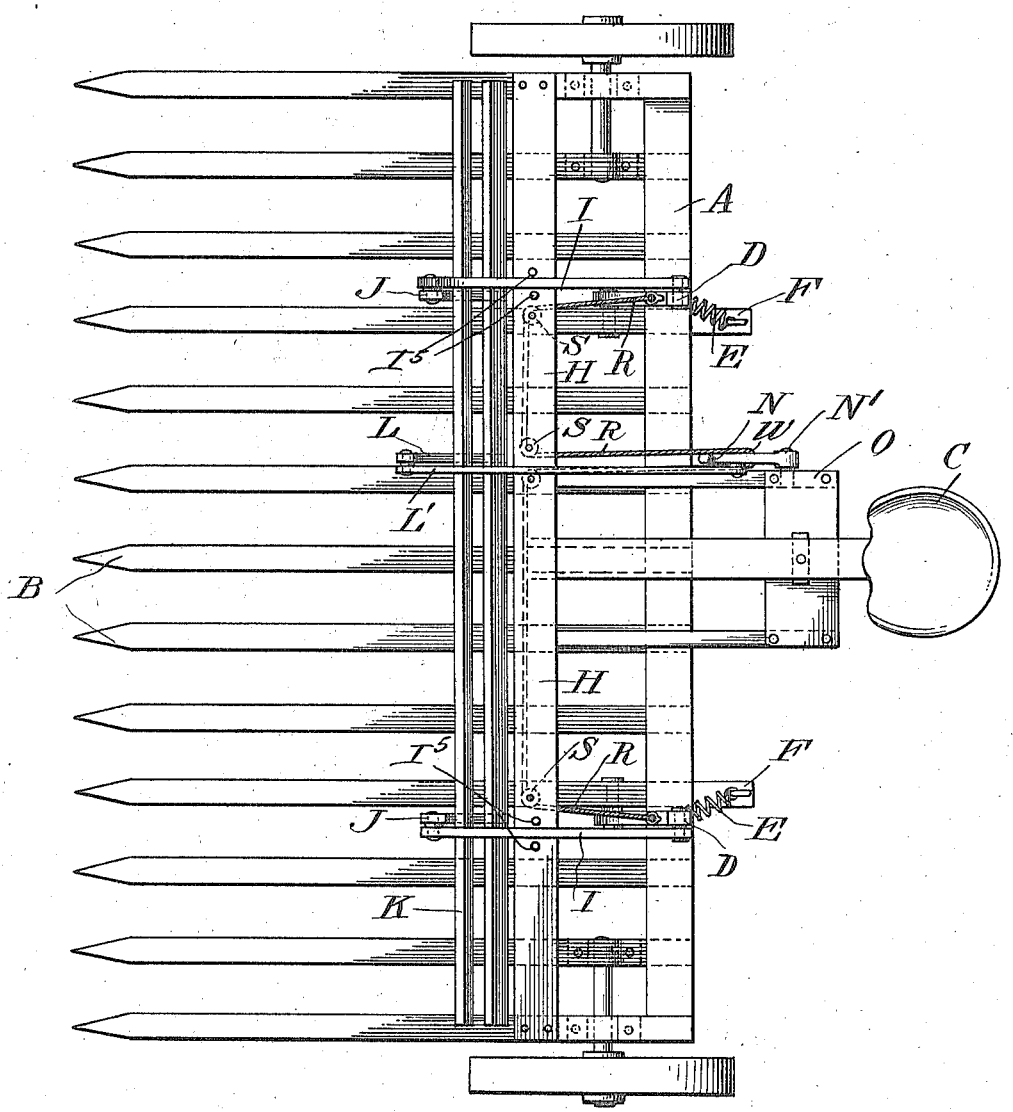

H. IVERSON.
HAY SWEEP.
APPLICATION FILED APR. 14, 1915.

1,181,893.

Patented May 2, 1916.
2 SHEETS—SHEET 1.

Witnesses
Fenton S Belt
J. N. Sherwood

Inventor
Henry Iverson
By Franklin N. Hough
Attorney

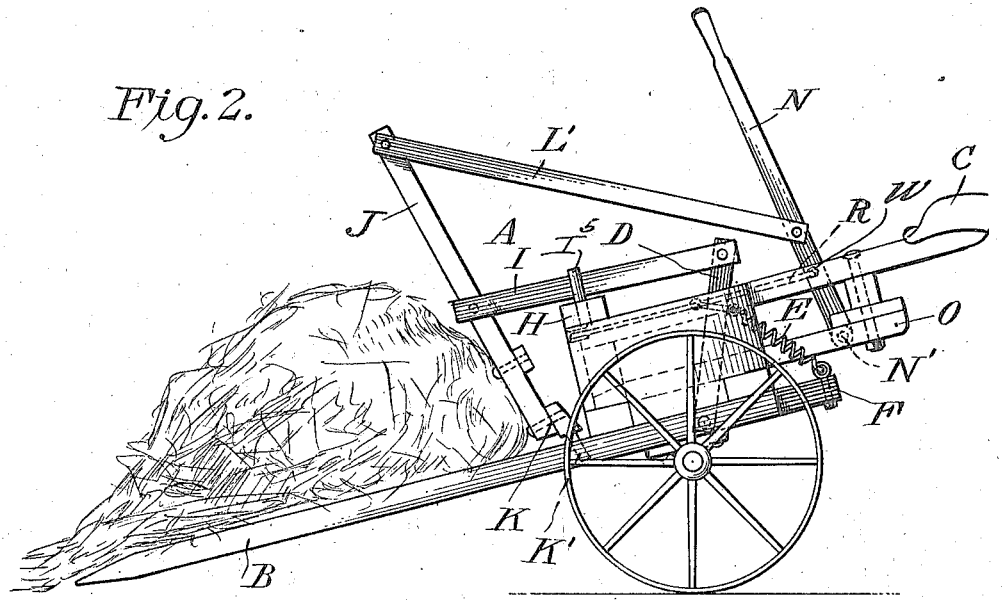
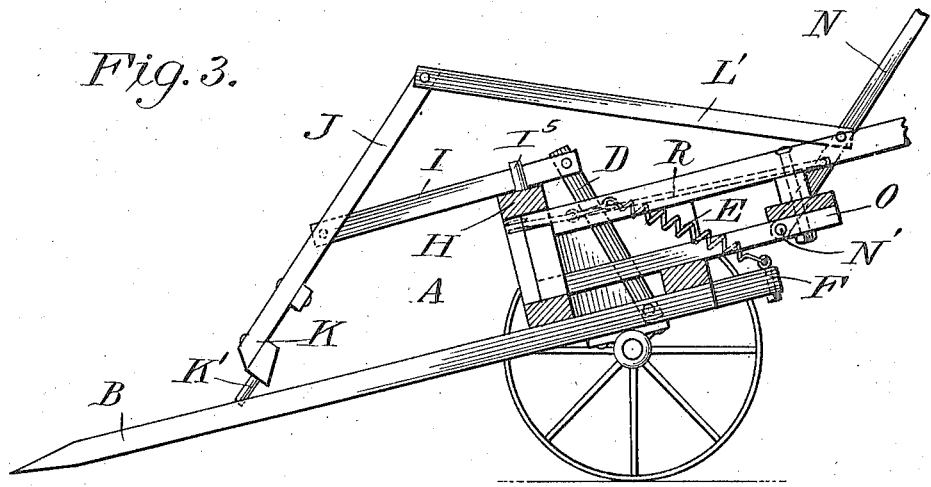

UNITED STATES PATENT OFFICE.

HENRY IVERSON, OF WAGNER, SOUTH DAKOTA.

HAY-SWEEP.

1,181,893.　　　　Specification of Letters Patent.　　Patented May 2, 1916.

Application filed April 14, 1915.　Serial No. 21,325.

*To all whom it may concern:*

Be it known that I, HENRY IVERSON, a citizen of the United States, residing at Wagner, in the county of Charles Mix and State of South Dakota, have invented certain new and useful Improvements in Hay-Sweeps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hay sweeps for use in connection with hay stacker forks and consists of a simple and efficient apparatus of this nature having various details of construction, combinations and arangements of parts which will be hereinafter fully described, shown in the accompanying drawings and then specifically defined in the appended claim.

My invention is illustrated in the accompanying drawings, in which:

Figure 1 is a top plan view of the apparatus. Fig. 2 is a side elevation showing the apparatus in readiness to be dumped, and Fig. 3 is a view showing the rake at its farthest forward throw.

Reference now being had to the details of the drawings by letter, A designates a hay sweep or rake having teeth B spaced apart, and C is a seat mounted upon the frame, the apparatus being mounted as shown in the drawings. Pivotally mounted upon the rear ends of certain teeth of the sweep are the bars D, and springs E connect said bars D with an extension piece F and tend to normally hold the same at their farthest outward limit. Projecting upward from a transverse crosspiece H of the frame are pins $I^5$ spaced apart and which are adapted to guide the bars I as they move longitudinally, said bars being pivotally connected at corresponding ends to the upper ends of the bars D, and their forward ends are pivotally connected to the bars J which carry the clearer K having pins K' thereon. The bar L attached to the clearer intermediate of the bars J, as shown in Fig. 2 of the drawings, has pivotally connected to its upper end a link L' which in turn is pivoted to a lever N mounted upon the pivot N' at the rear extension O of the frame, as shown clearly in Fig. 1 of the drawings. A cable R passes about the pulleys S upon the frame and also through an aperture W in the lever N and the ends of said cable are fastened to the bars D.

In operation, when the lever is pulled rearward, the rake K with pins K' thereon is moved forward through the connections shown and described, causing the teeth K' to push the hay or straw from the teeth B.

By the provision of an apparatus embodying the features of my invention, it will be noted that a simple and efficient apparatus is produced whereby hay which has been raked up may be deposited upon the stacker without lodging upon the forks or teeth.

What I claim to be new is:—

A hay sweep comprising a frame with wheels upon which the same is mounted, teeth projecting forwardly from the frame, upright pins upon the frame spaced apart, a rake clearing member having transverse bars fastened thereto and provided with pins movable between said teeth, links arranged in pairs, one link of each pair being spring-pressed and pivoted to the frame and the other of each pair pivoted to the rake clearing member and guided by said upright pins, an apertured lever having pivotal link connection with the rake clearing member, a cable, pulleys upon the frame and about which and the aperture in said lever the cable passes, the ends of the cable being fastened to said links which have pivotal connection with the frame.

In testimony whereof I hereunto affix my signature in presence of two witnesses.

HENRY IVERSON.

Witnesses:
B. V. MORGAN,
F. S. STROHBEHN.

Copies of this patent may be obtained for five cents each, by addressing the "Commissioner of Patents, Washington, D. C."